US010681864B2

(12) United States Patent
Matt et al.

(10) Patent No.: US 10,681,864 B2
(45) Date of Patent: Jun. 16, 2020

(54) CHARGING STATION WITH A DATA CONNECTION FOR A GROUND WORKING SYSTEM

(71) Applicant: Andreas Stihl AG & Co. KG, Waiblingen (DE)

(72) Inventors: Sebastian Matt, Kufstein (AT); Samuel Zoettl, Birgitz (AT); Klaus Melser, Langkampfen (AT); Peter Ritzer, Ebbs (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 26 days.

(21) Appl. No.: 16/004,409

(22) Filed: Jun. 10, 2018

(65) Prior Publication Data
US 2018/0352734 A1 Dec. 13, 2018

(30) Foreign Application Priority Data
Jun. 9, 2017 (EP) .................................... 17400035

(51) Int. Cl.
*A01D 34/00* (2006.01)
*G05D 1/02* (2020.01)
(Continued)

(52) U.S. Cl.
CPC ........... *A01D 34/008* (2013.01); *A01D 34/64* (2013.01); *A01D 69/02* (2013.01); *B60L 53/12* (2019.02);
(Continued)

(58) Field of Classification Search
CPC ...... A01D 34/008; A01D 69/02; A01D 34/64; A01D 2101/00; B60L 53/14; B60L 53/12;
(Continued)

(56) References Cited

U.S. PATENT DOCUMENTS 8,106,626 B2 1/2012 Li et al.
2005/0230166 A1 10/2005 Petersson et al.
(Continued)

FOREIGN PATENT DOCUMENTS

DE 202013101894 U1 9/2014
DE 102015114568 A1 3/2017
(Continued)

OTHER PUBLICATIONS

Anonymous: "Husqvarna Automower 230 ACX, Reviews—Product Review.com.au", May 18, 2016, XP055425034, pp. 1 to 10, URL:https://www.productreview.com.au/p/husqvarna-automower-230acx-220ac-210c/m/230acx.html.
(Continued)

*Primary Examiner* — Yuen Wong
(74) *Attorney, Agent, or Firm* — Walter Ottesen, P.A.

(57) ABSTRACT

A ground working system has at least one self-driving ground working device with a drive, a control unit and an in-device battery for supplying energy to the ground working device. An operating region (A), within which the ground working device travels automatically along a traveling path (W), is determined by an edge boundary. At least one charging station for charging the battery of the ground working device via an electrical energy-transferring charging connection is provided. The charging connection is also configured as a data connection for the transmission of data packets.

21 Claims, 3 Drawing Sheets

(51) Int. Cl.
   *G05D 1/00* (2006.01)
   *A01D 34/64* (2006.01)
   *A01D 69/02* (2006.01)
   *B60L 53/60* (2019.01)
   *B60L 53/12* (2019.01)
   *B60L 53/14* (2019.01)
   *A01D 101/00* (2006.01)

(52) U.S. Cl.
   CPC ............... *B60L 53/14* (2019.02); *B60L 53/60* (2019.02); *G05D 1/0022* (2013.01); *G05D 1/0225* (2013.01); *G05D 1/0259* (2013.01); *G05D 1/0287* (2013.01); *A01D 2101/00* (2013.01)

(58) Field of Classification Search
   CPC .... B60L 53/60; G05D 1/0259; G05D 1/0022; G05D 1/0287; G05D 1/0225; H04L 67/34; H04L 67/141; H04L 67/125; H04L 41/082; H04B 5/0037; H02J 7/0027; H01R 13/10; H01R 13/04; G08C 17/04
   See application file for complete search history.

(56) References Cited

U.S. PATENT DOCUMENTS

| | | | |
|---|---|---|---|
| 2011/0202307 A1* | 8/2011 | Petereit | A01D 34/008 702/150 |
| 2013/0006418 A1* | 1/2013 | Tian | A47L 9/2805 700/245 |
| 2014/0324246 A1 | 10/2014 | Biber et al. | |
| 2015/0328775 A1* | 11/2015 | Shamlian | B25J 9/1676 700/258 |
| 2016/0014955 A1 | 1/2016 | Hans | |
| 2017/0020064 A1 | 1/2017 | Doughty et al. | |
| 2017/0215336 A1 | 8/2017 | Andriolo et al. | |
| 2018/0352728 A1 | 12/2018 | Ritzer et al. | |
| 2018/0352729 A1 | 12/2018 | Matt et al. | |
| 2018/0352733 A1 | 12/2018 | Matt et al. | |
| 2018/0353040 A1 | 12/2018 | Matt et al. | |

FOREIGN PATENT DOCUMENTS

| | | |
|---|---|---|
| EP | 1906205 A1 | 4/2008 |
| EP | 1933467 A2 | 6/2008 |
| EP | 2269433 A1 | 1/2011 |
| EP | 2390741 A2 | 11/2011 |
| EP | 2656718 A1 | 10/2013 |
| EP | 2658073 A1 | 10/2013 |
| EP | 2667271 A1 | 11/2013 |
| EP | 2945037 A2 | 11/2015 |
| EP | 3069593 A1 | 9/2016 |
| WO | 03104908 A1 | 12/2003 |
| WO | 2013/141206 A1 | 9/2013 |
| WO | 2014158060 A1 | 10/2014 |
| WO | 2015072897 A1 | 5/2015 |
| WO | 2016102143 A1 | 6/2016 |
| WO | 2016103068 A1 | 6/2016 |
| WO | 2016178616 A1 | 11/2016 |
| WO | 2018060966 A1 | 4/2018 |

OTHER PUBLICATIONS

Anonymous: "Rasenmaeher Roboter Signalverstaerker", May 17, 2016, XP055425027, pp. 1 to 7, URL:https://web.archive.org/web/20160517003655/http://robomaeher.de/blog/rasenmaher-roboter-signalverstarker/.

* cited by examiner

CHARGING STATION WITH A DATA CONNECTION FOR A GROUND WORKING SYSTEM

CROSS REFERENCE TO RELATED APPLICATION

This application claims priority of European patent application no. 17 400 035.6, filed Jun. 9, 2017, the entire content of which is incorporated herein by reference.

FIELD OF THE INVENTION

The invention relates to a ground working system having at least one self-driving ground working device with a drive, a control unit and an in-device battery for supplying energy to the ground working device. An operating region of the ground working device is determined by an edge boundary, wherein the ground working device travels automatically within the operating region along a traveling path. At least one charging station for charging the battery of the ground working device is provided, having an electrical energy-transferring charging connection from the charging station to the ground working device.

BACKGROUND OF THE INVENTION

It is known to operate a self-driving ground working device in an operating region that is surrounded by a boundary wire. The ground working device travels automatically within an operating region over a random, predetermined or automatically planned path. A base station of the system is electrically connected to the boundary wire and transmits on the boundary wire a wire signal, the electromagnetic field of which induces a reception signal in a reception coil of the ground working device. The reception signal is processed in a control unit for controlling the ground working device and the ground working device is controlled with the aim in particular of not leaving the operating region. For charging the battery, the base station connected to the boundary wire is usually configured at the same time as a charging station.

Ground working systems including multiple self-driving ground working devices have also been proposed, in particular a system including multiple lawnmowers working an operating area in a combined manner. For charging the in-device batteries, the ground working devices go to the charging station and only leave it when the in-device battery has been charged to a predetermined state of charge.

If multiple ground working devices work a common operating region as a team, then for example the required operating time is dependent on the number of lawnmowers operating in the team. If one ground working device has to be charged more frequently than others, for example because of a decreasing charging capacity of a battery, the operating times of the individual ground working devices change. For the management and control of the team, the operating variables stored in a ground working device must therefore be adapted. In addition, the operating software of a ground working device and/or of the base station or of a charging station must be updated, amended or replaced at different time intervals. This requires on the one hand a great expenditure of time and on the other hand usually also special technical knowledge. To update operating software, the user must often intervene itself or else use technical services offered by third parties.

SUMMARY OF THE INVENTION

It is an object of the invention to provide a ground working system with at least one ground working device in such a way that not only can the operating variables stored in the ground working device be easily adapted, but in addition updating of operating software is also possible.

The object can, for example, be achieved by the charging connection between a charging station and a ground working device being used at the same time as a data connection for the transmission of data packets, so that data packets can be exchanged between the ground working device and the charging station, in particular before, during or after the charging of the battery.

This not only proves to be advantageous during the transmission of operating variables, for example as a control record in the data packet, but at the same time opens up the possibility of being able to pass on operating software, adapted service programs or user-oriented applications via the data connection, in particular during or before a charging operation.

The data connection for transmitting data packets is in particular bidirectional. Data packets can be transmitted from the charging station to the ground working device or from the ground working device to the charging station.

In the charging station, a control unit of the ground working system may be provided. A control unit may also be a higher-level control unit, such as for example an external server or the like, which is connected to the charging station for example by radio. The charging station and/or the ground working device are expediently connected to a higher-level control unit such as a server, so that data packets transmitted from the ground working device to the charging station can be passed on to the server and processed there. In particular if a team of any desired number of ground working devices is operated in the operating region, the control and management of the entire team can take place via a local, higher-level control unit or an external control unit such as for example the server. Thus, operating variables of the ground working device selected while taking into account the data packets received can be adapted, thus for example the working time can be adapted in accordance with the progress made in work. Via the central server, an adaptation of the operating times can be performed, as can a change of a device-specific operating variable stored in the ground working device. Before, during or after a charging operation, the adapted operating variables are transmitted as data packets via the charging station to the ground working device that has entered the charging station and are stored there in the memory of the ground working device. The amended operating variables can be taken into account during further operation in the ground working device by the device-internal control unit, and for example the traveling paths adapted correspondingly.

In an embodiment, it may also be envisaged to further process the data packets transmitted from the charging station to the ground working device in the central server.

After the ground working system has been set up, the data packets can be transmitted in various transmitting directions. Thus, a data packet may be transmitted from the charging station via the charging connection to the ground working device and from there to the server. Also, a data packet may be transmitted from the server to the charging station and via the charging connection to the ground working device. As an alternative or in addition, it is also advantageous to transmit data packets from the ground working device and via the charging connection to the charging station, which processes the data packets itself and/or transmits them via a data connection to the external server, which can also process the data packets. A data transmission from the server to the ground working device and via the charging connection to the charging station may likewise be advantageous.

In an embodiment, new data packets are transmitted from the charging station to the ground working device. The data packets received by the ground working device are processed—during the following operation of the ground working device—in the in-device control unit. These new data packets may be collected in a local control unit of the charging station. Also, the new data packets may for example be transmitted via a radio connection of the charging station from an external server.

In an embodiment, the data packets transmitted from the ground working device to the charging station may be externally processed in the local control unit of the charging station, in particular in a central server. In the case of a ground working system with multiple ground working devices, operating data of the ground working device can thus be transmitted during the charging time of the ground working device as data packets to a higher-level processing unit, such as an external server, and evaluated there. In respect of the team of ground working devices, the higher-level processing unit can suitably adapt the operating variables in accordance with the received data packets and transmit them via the charging station to the ground working device that is still in the charging station. Consequently, operating variables of the ground working device to be charged can be transmitted, evaluated and adapted during a charging operation.

In a particular configuration, it is envisaged to configure the charging connection as a contactless charging connection. The contactless charging of the battery takes place via a transmission coil in the charging station and a charging coil in the ground working device. The data connection may be established via the transmission coil and the charging coil of the charging device. The data connection is preferably configured as a near-field connection.

In an embodiment, the charging connection is configured as a plug connection. The plug connection expediently includes contacts, in particular of a contact tab and a contact socket. The contact tab is advantageously formed on the charging station and the contact socket on the ground working device. The data connection is in this case established via the electrical power contacts of the plug connection. It should be emphasized that the data connection takes place via the electrical power contacts and no additional data contacts are necessary.

The edge boundary of the operating region is advantageously formed by a boundary wire. This boundary wire is laid in particular as a wire loop. A base station, which is electrically connected to the boundary wire and transmits a wire signal on the boundary wire, is expediently provided. The wire signal transmitted on the boundary wire induces a reception signal in a reception coil of the ground working device. The reception signal is processed in the control unit of the ground working device and used for controlling the ground working device on its traveling path within the operating region.

The base station is preferably configured as a charging station. In particular, the base station and the charging station are formed identically.

In particular, multiple autonomously driving ground working devices, which in a particular configuration are provided as self-driving lawnmowers, are arranged in the operating region.

In an embodiment, it is provided that a data packet transmitted from the ground working device via the data connection updates the operating software of the charging station. Thus, a ground working device may for example be connected via a radio link to a higher-level server, the server responding to an update requirement, for example of firmware or operating software of the charging station, by transmitting this update to the ground working device. The received data packets are stored in a memory of the ground working device. As soon as the ground working device has entered a charging station and contact has been made via the charging contacts, a comparison of the version of the software operated on the charging station with the software stored on the ground working device is performed. If there is a requirement to update the software on the charging station, the data packets stored on the ground working device are transmitted via the power contacts of the charging connection from the ground working device to the charging station. The transmission of the data packets may take place before, during and/or after the charging operation. The ground working device is at the same time a data carrier for update software.

It may also be expedient that a data packet transmitted from the charging station via the data connection of the charging connection updates the firmware or operating software of the ground working device. To this end, the charging station is expediently connected to a server, which receives the update software to be transmitted to the ground working device in data packets from the server. As soon as the ground working device has entered the charging station and contact has been made via the charging contacts, a comparison of the version of the update software kept on the charging station with the software operated on the ground working device is performed. If there is a requirement to update the software, the data packets stored on the charging station are transmitted via the power contacts of the charging connection from the charging station to the ground working device.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
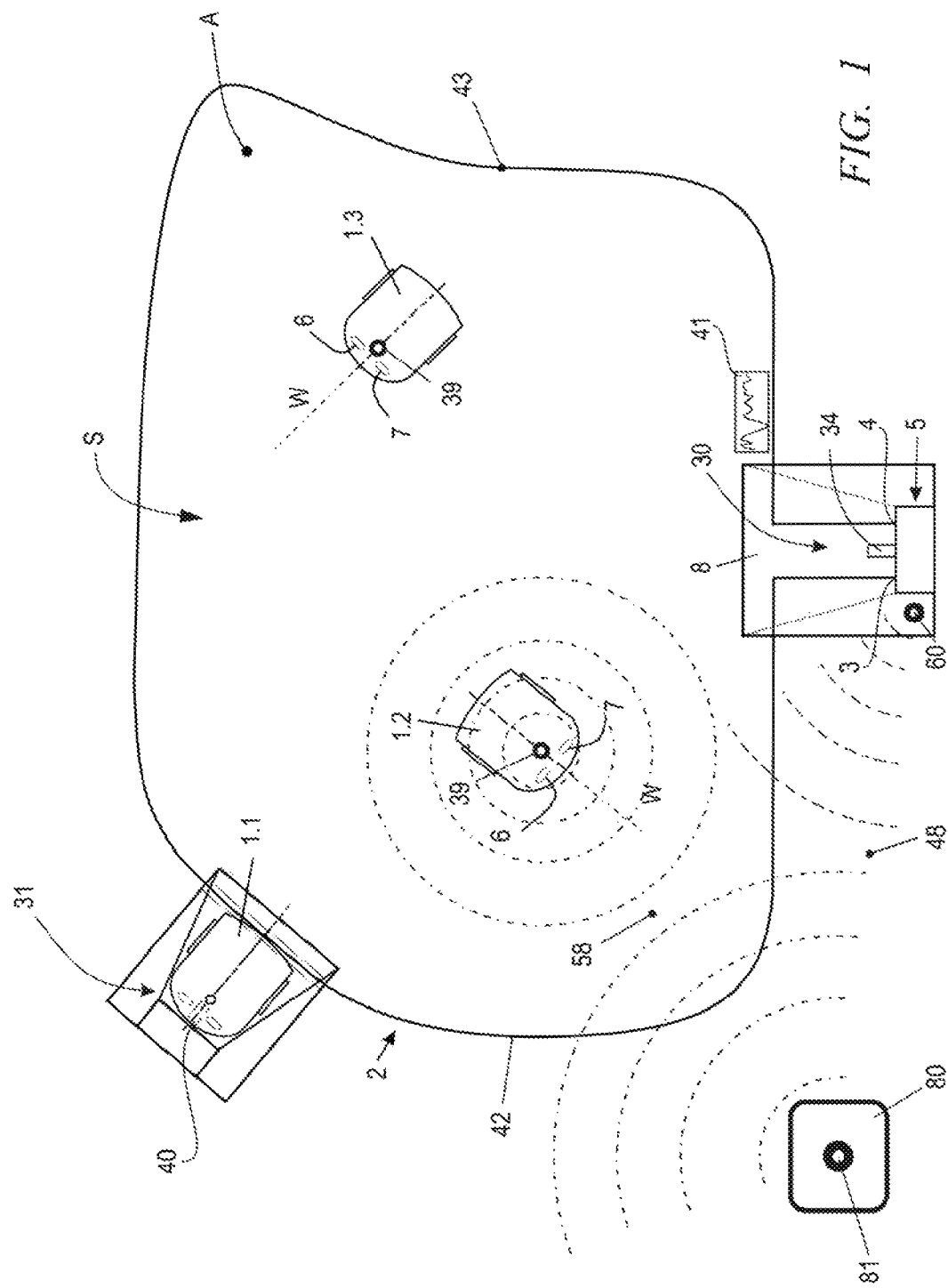
FIG. 1 shows in a schematic representation a ground working system including at least one ground working device driving itself in an operating region.

The ground working system S represented in FIG. 1 includes at least one self-driving ground working device 1.1, 1.2 and 1.3 for working a predetermined operating region A. In the embodiment shown, multiple, in particular three, ground working devices 1.1, 1.2 and 1.3 are shown for the combined working of the predetermined operating region A. The ground working system S may include fewer or more ground working devices. Each individual ground working device 1.1, 1.2 and 1.3 operates autonomously and travels automatically within the operating region A along a random, predetermined or automatically planned traveling path W.

In the embodiment shown, as in FIG. 1, the operating region A of the ground working system S is bounded by an edge boundary 2, which may be variously formed. Thus, within the scope of the invention, a virtual edge boundary 2 may be provided, for example set up via navigation data such as satellite navigation or radio beacons. There is also the possibility of storing an internal map in the ground working device, on the basis of which the ground working device orients itself and in which the edge boundary is entered. A further possibility for the edge boundary is—in particular in the case of lawnmowers as ground working devices—an optical detection of the edge of the lawn as the edge boundary. Thus, an autonomously traveling lawnmower may be provided with a camera, which detects the edge of the area of lawn to be worked as the edge boundary. If the edge of the area of lawn is detected, the lawnmower steers back onto the area of lawn.

In the embodiment shown, as in FIG. 1, the edge boundary 2 is formed by a boundary wire 43, which is laid in particular as a wire loop 42. The connection ends 3, 4 of the boundary wire 43 are connected to a transmission unit 5, which is provided in a base station 8. The transmission unit 5 transmits—preferably at fixed time intervals—electrical wire signals 41 onto the boundary wire 43. The wire signal 41 transmitted on the boundary wire 43 induces a reception signal in a reception coil 6, 7 of the ground working device 1.1, 1.2 and 1.3. This reception signal is processed in the ground working device 1.1, 1.2, 1.3 and used for controlling the ground working device 1.1, 1.2, 1.3 on its traveling path W. All of the ground working devices 1.1 to 1.3 traveling in the operating region A orient themselves on the basis of the wire signal 41 transmitted on the boundary wire 43.

Figure 2:
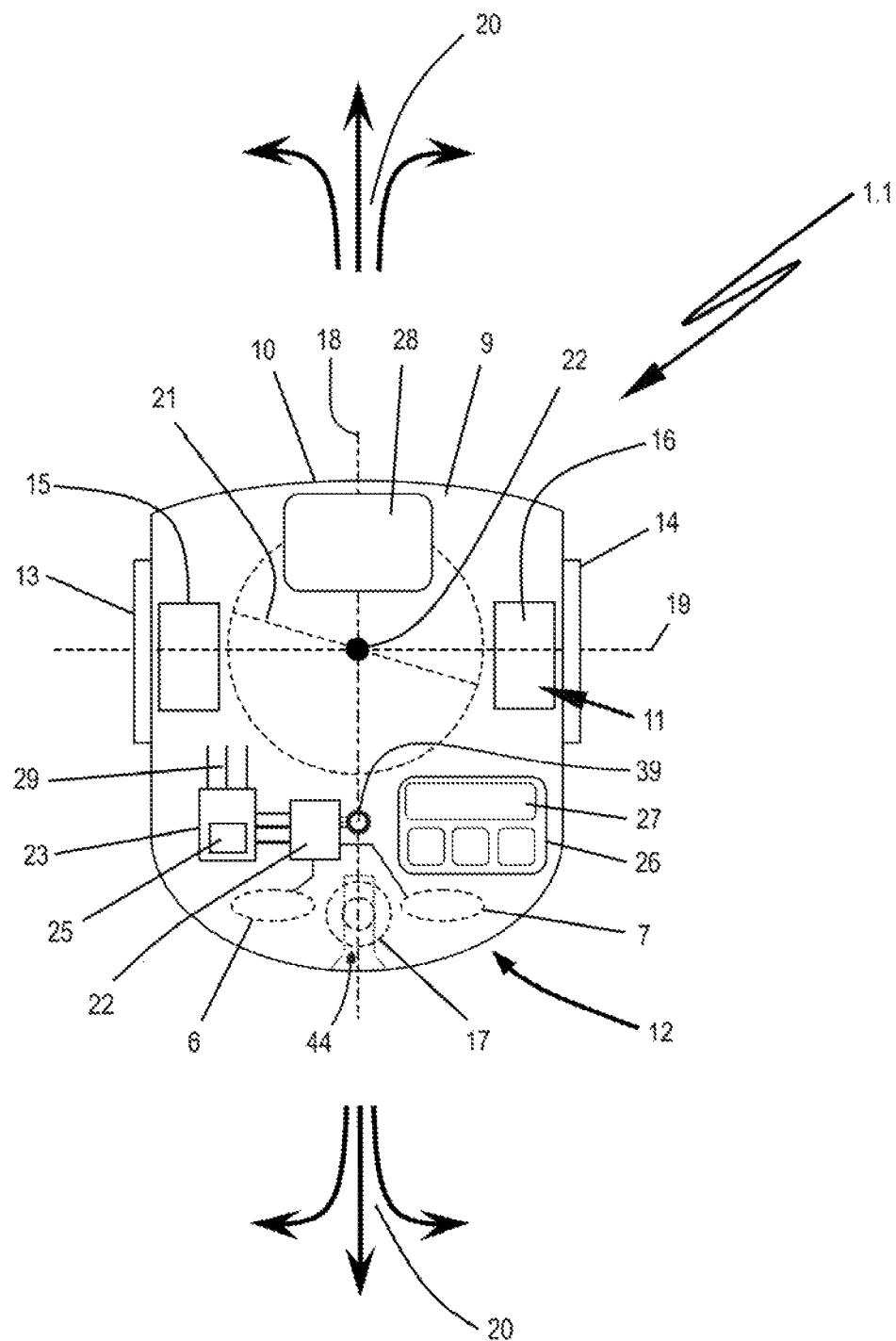
FIG. 2 shows in a schematic representation the construction of a ground working device in the example of a self-driving lawnmower.

The base station 8 shown in FIG. 2 is advantageously configured at the same time as a charging station 30.

Schematically shown in plan view in FIG. 2 is a ground working device 1.1, which is configured as a lawnmower 10. The representation of the autonomously operating, self-driving lawnmower is given by way of example. The ground working device 1.1 may also be configured as a scarifier, road sweeper, vacuum cleaner, autonomous ride-on lawnmower or similar ground working device.

The ground working device 1.1 represented as a lawnmower 10 in FIG. 2 includes a chassis with rear drive wheels 13, 14 with a drive 11. In the embodiment shown, each drive wheel 13, 14 is assigned an electrical drive motor 15, 16, which can drive the drive wheels 13 and 14 at different rotational speeds and/or in different directions of rotation for controlling the direction of the lawnmower 10.

Provided in the front region 12 of the housing 9 of the lawnmower, there is an in particular self-aligning third wheel 17. The third wheel 17 preferably lies on a longitudinal mid-axis 18 of the housing 9. The configuration of a chassis frame with four wheels may be expedient.

The drive wheels 13, 14 of the ground working device 1.1 shown rotate about a common drive axis 19. The drive axis 19—in the plan view of the lawnmower 10 as in FIG. 2—is in particular perpendicular to the longitudinal mid-axis 18 of the housing 9. For traveling in a straight line, the drive wheels 13 and 14 are to be driven synchronously via their electrical drive motors 15 and 16. For negotiating a curve, the drive wheels 13, 14 are driven for example with different rotational speeds by their drive motors 15, 16. Via the drive 11, the ground working device 1.1 can be moved in any desired traveling direction 20 forward or backward according to the arrows depicted.

In the embodiment as in FIG. 2, the ground working device 1.1 has an operating tool 21 between the drive wheels 13 and 14. In the embodiment as a lawnmower 10, the operating tool 21 is a blade rotating about a vertical rotation axis 22.

The control of the electrical drive motors 15 and 16 is carried out via an in-device control unit 23, which is connected via schematically indicated electrical lines 29 to the electrical drive motors 15 and 16.

The wire signal 41 transmitted on the wire loop 42 of the boundary wire 43 is received in the reception coils 6 and 7 of the ground working device 1.1. The reception coils 6 and 7 lie in the front region 12 of the housing 9, respectively on one side of the longitudinal mid-axis 18 of the ground working device 1.1. The reception signals induced in the reception coils 6 and 7 are preferably delivered to a common evaluation unit 24, which is connected to the control unit 23. Advantageously, the control unit 23 includes a memory 25 for an operating variable, which is expedient for operating the ground working device 1.1. Such an operating variable may be for example the start time of the operation, the duration of the operation, the cutting height (in the case of a configuration as a lawnmower), the traveling distance to a charging station, a mowing schedule as a weekly schedule or a similar operating variable.

As in FIG. 2, an input pad 26, which advantageously has a screen 27 and input keys, is provided for the user to enter information about operating variables. It may be expedient to configure the screen as a touchscreen, so that it is possible to dispense with input keys. If the information relating to operating variables is transmitted to the ground working device 1.1 in some other way, it is possible to dispense with an input pad 26.

It may be advantageous to form each ground working device 1.1, 1.2 and 1.3 with a further transmitter/receiver 39, which receives radio signals or infrared signals of a further transmitter/receiver 60, which may for example be provided at the base station 8. This wireless communication connection between a transmitter/receiver 60 of the charging station and the transmitter/receiver 39 of the on the ground working device 1.1 is advantageously configured as a radio link or the like. Possible radio links may be WLAN connections, Bluetooth connections, GSM connections, NFC connections or similar wireless connections, in particular near-field connections.

The electrical supply to the control unit 23 and to all its components is ensured by an in-device battery 28. The battery 28 is preferably inserted in the housing 9 of the ground working device 1.1.

During the operation of the ground working system S, the ground working devices 1.1, 1.2 and 1.3 are made to travel independently of one another within the operating region A to be worked, as a result of corresponding control of the drive motors 15 and 16. Each individual ground working device 1.1, 1.2 and 1.3 operates autonomously in accordance with the information of an operating variable in its memory 25.

During the operation of the ground working devices 1.1, 1.2 and 1.3, the battery charge decreases on account of the electrical loads that are operated. The discharge of the battery 28 of the various ground working devices 1.1, 1.2 and 1.3 may vary. This may be dependent on which electrical power the operating tool 21 and the drive 11 of the ground working device consume.

If a battery 28 of a ground working device 1.1, 1.2 or 1.3 has to be charged, the control unit 23 moves the corresponding ground working device 1.1, 1.2, 1.3 to a charging station, thus for example to a base station 8 configured as a charging station 30 or to an additional charging station 31, which may be positioned on the edge boundary 2.

In order for example to go to a charging station 31, the control unit 23 may move the corresponding ground working device 1.1, 1.2 or 1.3 to the edge boundary 2, in the embodiment shown move it to the boundary wire 43. When traveling over the boundary wire 43, the reception coils 6 and 7 of the ground working device 1.3 lie respectively on one side of the boundary wire 43. In this way, traveling along the boundary wire 43 can be ensured in an easy way.

Figure 3:
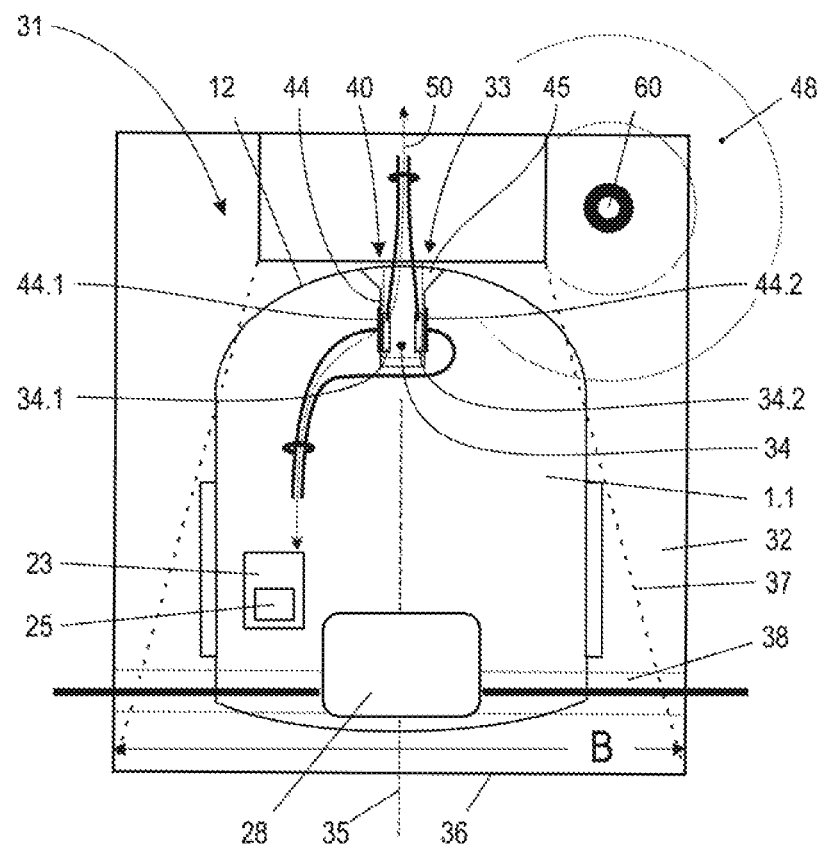
FIG. 3 shows in a schematic representation a plan view of a charging station with an electrical plug connection as a charging connection; and, FIG. 4 shows a plan view of a charging station with a contactless charging connection.

As shown in FIG. 1, the ground working system S has in particular multiple charging stations 30, 31. In FIG. 3, an additionally arranged charging station 31 is shown enlarged in a plan view. By way of example, this charging station 31 includes a base plate 32, which has at one end a housing head 33 with a contact tab 34. The contact tab 34 is preferably provided aligned in a longitudinal mid-axis 35 of the charging station 31. The base plate 32 may expediently have a ramp 37, rising from a front edge 36 to the contact tab 34. Transversely in relation to the longitudinal mid-axis 35, a receiving channel 38 may be formed in the base plate 32. The receiving channel 38 preferably lies facing the ground of the operating region A. The receiving channel 38 preferably extends over the entire width B of the base plate 32.

Shown in FIG. 3—in a way corresponding to the representation in FIG. 1—is a ground working device 1.1, which has moved up onto the ramp 37 of the charging station 31 and has in its front region 12 a contact socket 44. As also shown by FIG. 2—the contact socket 44 lies on the longitudinal mid-axis 18 of the housing 9 of the ground working device 1.1. The contact socket 44 widens at its outer end into a contact funnel 45, in order to ensure easy insertion of the contact tab 34 into the contact socket 44. In the charging position of the ground working device 1.1 shown, the contact tab 34 engages in the contact socket 44 of the ground working device 1.1 and establishes an electrical charging connection 40 between the charging station 31 and the ground working device 1.1. The battery 28 provided in the ground working device 1.1 is charged with a charging current via the power contacts of the electrical plug connection including the contact tab 34 and the contact socket 44 as a charging connection 40.

As represented in FIG. 3, the contact tab 34 has two power contacts 34.1 and 34.2, which are in electrical contact with assigned power contacts 44.1 and 44.2 of the contact socket 44. The power contacts 34.1, 44.1; 34.2, 44.2 preferably lie on sides of the longitudinal mid-axis 35 that are opposite one another. The electrical charging current for charging the battery 28 of the ground working device 1.1 flows via the power contacts 34.1, 44.1; 34.2, 44.2.

It is envisaged to form a data connection 50 at the same time via the charging connection 40. The charging connection 40 can consequently be used on the one hand for charging and on the other hand as a data connection 50. In this way, data packets can be exchanged between the ground working device and the charging station before, during or after the charging of the battery via just one electrical connection. In the case of an embodiment as a plug connection according to FIG. 3, the data connection 50 is established via the electrical power contacts 34.1 and 44.1 and also 34.2 and 44.2. Via this data connection 50, data packets can be transmitted from the charging station 31 to the ground working device 1.1 and/or from the ground working device 1.1 to the charging station 31 before, during or after the charging of the battery 28.

Data packets transmitted to the ground working device 1.1 may be stored in the memory 25 of the ground working device 1.1 and/or be processed by the control unit 23. Data supplementing the operating variable, such as for example an adapted operating time of the device, an altered cutting height (in the case of a configuration as a lawnmower), data relating to a mowing schedule as a weekly schedule or similar supplementary operating variables, may be transmitted to the ground working device 1.1 before, during or after the charging of the battery 28.

Via the data connection 50, data packets can also be transmitted from the ground working device 1.1 to the charging station 31, it being possible for such data packets to be transmitted for example via a radio connection 48 to a higher-level processing unit such as a server 80 or the like. To this end, the charging station 31 expediently has a transmitter/receiver 60, which communicates in particular wirelessly with a higher-level server 80. The radio connection 48 is advantageously configured as a WLAN connection, Bluetooth connection, GSM connection, NFC connections or similar wireless connections.

If multiple ground working devices 1.1, 1.2 and 1.3 form a team for working an operating region A, this team can expediently be managed and controlled via a higher-level server. In this case, there does not have to be a permanent data connection between the ground working devices 1.1, 1.2 and 1.3 and a higher-level server 80 or similar central control device. It may be sufficient if the data necessary for the management and control of the ground working devices 1.1, 1.2 and 1.3 are exchanged in each case when the ground working device 1.1 has entered a charging station 31—as shown in FIGS. 1 and 3. During the charging operation, data packets relating to operating data of the ground working device 1.1 may be exchanged to the server 80 for evaluation. The server 80 may in return transmit the data packets for the management and control of the team of ground working devices 1.1, 1.2 and 1.3 via the transmitter/receiver 60 to the ground working device 1.1, 1.2 and 1.3, the ground working device 1.1, 1.2, 1.3 storing the received data packets in a memory, in particular in the memory 25 of the control unit 23, for further use.

Figure 4:
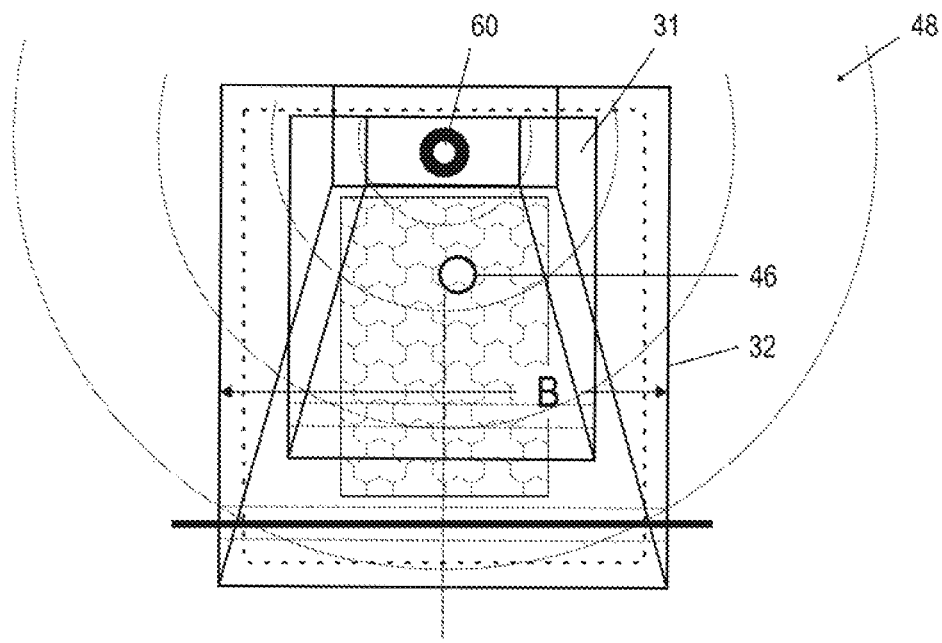

In an embodiment, it may be envisaged to configure the charging connection 40 between a ground charging device 1.1, 1.2 and 1.3 and a charging station 31 as a contactless charging connection 40. Provided in the base plate 32—as schematically indicated in FIG. 4—is a transmission coil 46, via which a charging current is transmitted from the charging station 31 to a charging coil in the ground working device 1.1, 1.2, 1.3. By means of this contactless data connection 40, a data connection for data packets via which data packets can be transmitted from the ground working device 1.1, 1.2, 1.3 to the charging station 31—and preferably via a transmitter/receiver 60—to a higher-level server 80, is also formed before, during or after the charging. The data connection 50 is bidirectional. Data packets can also be transmitted in the opposite direction, from the charging station 31 to the ground working device 1.2, 1.2, 1.3 that has entered the charging station 31.

There may be any number of charging stations 30 arranged along the edge boundary 2 or the boundary wire 43 shown in the embodiment. A charging station 31 is simply positioned on the edge boundary 2 or on the boundary wire 43, the boundary wire 43 being continued uninterruptedly in the region of the charging station 31. Preferably, the boundary wire 43 runs in the receiving channel 38 of the base plate 32 of the charging station 31. As a result, a predetermined alignment of the charging station 31 in relation to the boundary wire 43 can be ensured. It is thus advantageous if the boundary wire crosses the longitudinal mid-axis 35 of the charging station 31 perpendicularly. The ground working device coming along on the boundary wire 43 consequently approaches in a traveling direction perpendicular to the longitudinal mid-axis 35. As a result, a predetermined traveling path for going to the charging station 31 can be precisely predetermined.

As FIG. 1 shows, a charging station 31 is positioned at a freely chosen location on the edge boundary 2 or the boundary wire 43. The boundary wire 43 is led uninterruptedly through the charging station 31.

Via the data connection 50 established between the charging station 30, 31 and the ground working device 1.1, 1.2, 1.3, the operating software of the charging station 30, 31 can be updated with a data packet transmitted from the ground working device 1.1, 1.2, 1.3. Thus, a ground working device 1.1, 1.2, 1.3 may for example be connected via its transmitter/receiver 39 and a radio connection 58 to a transmitter/receiver 81 of a higher-level server 80. The server 80 responds to an update requirement, for example of firmware or operating software of the charging station 30, 31, by transmitting this update to the ground working device 1.1, 1.2, 1.3. The received data packets are stored in a memory 25 of the ground working device 1.1, 1.2, 1.3. As soon as the ground working device 1.1, 1.2, 1.3 has entered a charging station 31 and contact has been made via the power contacts 34.1, 44.1; 34.2, 44.2, a comparison of the version of the software operated on the charging station 31 with the software stored on the ground working device 1.1, 1.2, 1.3 is performed. If there is a requirement to update the software on the charging station 31, the data packets stored on the ground working device 1.1, 1.2, 1.3 are transmitted via the power contacts 34.1, 44.1; 34.2, 44.2 of the charging connection 40 from the ground working device 1.1, 1.2, 1.3 to the charging station 31. The transmission of the data packets may take place before, during and/or after the charging operation. The ground working device 1.1, 1.2, 1.3 is at the same time a data carrier for update software of the charging stations 30, 31.

It may also be expedient that a data packet transmitted from the charging station 31 via the data connection 50 of the charging connection 40 updates the firmware or operating software of the ground working device 1.1, 1.2, 1.3. To this end, the charging station 31 is expediently connected via a radio connection 48 to a server 80, which receives the update software to be transmitted to the ground working device 1.1, 1.2, 1.3 in data packets from the server 80. As soon as the ground working device 1.1, 1.2, 1.3 has entered the charging station 31 and contact has been made via the power contacts 34.1, 44.1; 34.2, 44.2, a comparison of the version of the update software kept on the charging station 31 with the software operated on the ground working device 1.1, 1.2, 1.3 is performed. If there is a requirement to update the software, the data packets stored on the charging station 31 are transmitted via the power contacts 34.1, 44.1; 34.2, 44.2 of the charging connection 40 from the charging station 31 to the ground working device 1.1, 1.2, 1.3. The charging station 31 forms a distributor of the update software for all of the ground working devices 1.1, 1.2, 1.3.

Further advantageous embodiments are provided by any desired combination of the features specified in the description and the claims and the embodiments described.

It is understood that the foregoing description is that of the preferred embodiments of the invention and that various changes and modifications may be made thereto without departing from the spirit and scope of the invention as defined in the appended claims.

What is claimed is:

1. A ground working system comprising:
   at least one self-driving ground working device having a drive, a control unit and an in-device battery for supplying energy to said at least one self-driving ground working device, wherein an operating region (A) of said at least one self-driving ground working device is determined by an edge boundary;
   said at least one self-driving ground working device being configured to travel automatically within said operating region (A) along a traveling path (W);
   a charging station for charging said in-device battery of said at least one self-driving ground working device via an electrical energy-transferring charging connection; and,
   said charging connection also being configured as a data connection for the transmission of data packets.

2. The ground working system of claim 1, wherein said data connection is a bidirectional data connection.

3. The ground working system of claim 1, wherein said charging station is connected to a central server.

4. The ground working system of claim 1 further comprising:
   a central server;
   said charging station being connected to said central server; and,
   said central server being configured to process data packets to be transmitted from said charging station to said at least one self-driving ground working device.

5. The ground working system of claim 1, wherein said at least one self-driving ground working device is connected to a central server.

6. The ground working system of claim 1 further comprising:
   a central server;
   said at least one self-driving ground working device being configured to connect to said central server; and,
   said central server being configured to process data packets transmitted from said at least one self-driving ground working device to said charging station.

7. The ground working system of claim 1, wherein:
   said charging station transmits data packets to said at least one self-driving ground working device; and,
   said control unit of said at least one self-driving ground working device is configured to process the data packets.

8. The ground working system of claim 1, wherein said at least one self-driving ground working device is configured to transmit data packets to said charging station.

9. The ground working system of claim 1, wherein said charging connection is a contactless charging connection.

10. The ground working system of claim 1, wherein said charging connection is configured as a plug connection.

11. The ground working system of claim 10, wherein said plug connection has a contact tab and a contact socket.

12. The ground working system of claim 10 further comprising:
    a contact tab disposed on said at least one charging station; and,
    a contact socket disposed on said at least one self-driving ground working device.

13. The ground working system of claim 1, wherein:
    said charging connection includes electrical power contacts; and, said data connection is established via said power contacts.

14. The ground working system of claim 1 further comprising a boundary wire forming said edge boundary.

15. The ground working system of claim 14, wherein said boundary wire is laid as a wire loop.

16. The ground working system of claim 14 further comprising:
- a base station electrically connected to said boundary wire and configured to transmit a wire signal on said boundary wire;
- said at least one self-driving ground working device having a reception coil;
- wherein said wire signal transmitted on said boundary wire induces a reception signal in said reception coil of said at least one self-driving ground working device; and,
- said control unit is configured to process said reception signal and to use said reception signal for controlling said at least one self-driving ground working device on said traveling path (W).

17. The ground working system of claim 1, wherein said charging station is configured as a base station.

18. The ground working system of claim 1, wherein a multiplicity of autonomously operating ones of said self-driving ground working device are arranged in said operating region (A).

19. The ground working system of claim 1, wherein said at least one self-driving ground working device is a self-driving lawnmower.

20. The ground working system of claim 1, wherein:
- said charging station includes operating software; and,
- one of said data packets transmitted from said at least one self-driving ground working device via the data connection updates said operating software of said charging station.

21. The ground working system of claim 1, wherein:
- said at least one self-driving ground working device includes operating software; and,
- one of said data packets transmitted from said charging station via said data connection updates said operating software of said at least one self-driving ground working device.

* * * * *